US009219339B2

(12) United States Patent
Lai

(10) Patent No.: US 9,219,339 B2
(45) Date of Patent: Dec. 22, 2015

(54) COMPUTER HOST POWER MANAGEMENT SYSTEM HAVING EXTENSION CORD SOCKETS

(71) Applicant: Li-Chun Lai, New Taipei (TW)

(72) Inventor: Li-Chun Lai, New Taipei (TW)

(*) Notice: Subject to any disclaimer, the term of this patent is extended or adjusted under 35 U.S.C. 154(b) by 473 days.

(21) Appl. No.: 13/650,624

(22) Filed: Oct. 12, 2012

(65) Prior Publication Data

US 2014/0103721 A1  Apr. 17, 2014

(51) Int. Cl.
| | |
|---|---|
| H01R 25/00 | (2006.01) |
| H01R 13/70 | (2006.01) |
| G06F 1/26 | (2006.01) |
| G06F 1/30 | (2006.01) |
| H01R 13/66 | (2006.01) |
| H01R 24/64 | (2011.01) |

(52) U.S. Cl.
CPC .............. *H01R 25/003* (2013.01); *G06F 1/266* (2013.01); *G06F 1/30* (2013.01); *H01R 13/70* (2013.01); *H01R 13/665* (2013.01); *H01R 13/6675* (2013.01); *H01R 24/64* (2013.01); *Y10T 307/469* (2015.04)

(58) Field of Classification Search
CPC .. H01R 25/003; H01R 24/64; Y10T 307/469; G06F 1/266; G06F 1/30
USPC .............................................. 307/39; 713/300
See application file for complete search history.

(56) References Cited

U.S. PATENT DOCUMENTS

| | | | | |
|---|---|---|---|---|
| 2007/0124604 | A1* | 5/2007 | Feldstein et al. | 713/300 |
| 2009/0217069 | A1* | 8/2009 | Chen et al. | 713/322 |
| 2010/0102631 | A1* | 4/2010 | Chiou | 307/39 |
| 2010/0213875 | A1* | 8/2010 | Lai | 315/307 |
| 2010/0328849 | A1* | 12/2010 | Ewing et al. | 361/622 |
| 2011/0066478 | A1* | 3/2011 | Marin | 705/14.4 |
| 2011/0083022 | A1* | 4/2011 | Lai | 713/300 |
| 2012/0104869 | A1* | 5/2012 | Lai | 307/117 |
| 2013/0049466 | A1* | 2/2013 | Adams | 307/39 |
| 2014/0103721 | A1* | 4/2014 | Lai | 307/39 |

* cited by examiner

*Primary Examiner* — Jared Fureman
*Assistant Examiner* — James P Evans
(74) *Attorney, Agent, or Firm* — WPAT, P.C.; Anthony King

(57) ABSTRACT

A computer host power management system having extension cord sockets is disclosed, comprising a socket body providing alternative current (AC) power to a computer host, in which the socket body includes AC power output plugholes, an AC power input plug, a control device and a power supply device. Herein the control device is configured with Universal Serial Bus (USB) ports and capable of determining whether the computer host signal transferred from the USB port is normal. In case of abnormal conditions, a second microprocessor in the power supply device is driven to cause a power automatic switch to turn off the AC power such that the computer host enters into the shutdown status. Later, after a lapse of preset time, the second microprocessor drives once again the power automatic switch to turn on AC power thereby rebooting the computer host.

10 Claims, 5 Drawing Sheets

COMPUTER HOST POWER MANAGEMENT SYSTEM HAVING EXTENSION CORD SOCKETS

BACKGROUND OF THE INVENTION

1. Field of the Invention

The present invention generally relates to a computer host power management system having extension cord sockets; in particular, the present invention relates to management system capable of autonomously determining whether a computer host fails and automatically controlling rebooting actions of the computer host.

2. Description of Related Art

At present, in order to allow a set of terminal apparatus to be shared by multiple computer hosts thus further achieving controls of multiple computer hosts, it is common to apply the computer switch, also known as KVM, to implement such an objective. So-called KVM actually indicates a combined abbreviation from the first alphabet of "Keyboard", "Video" and "Mouse", respectively, which can be used to link multiple computer hosts and allow such linked computer hosts to share a set of keyboard, video display and mouse. In application, this set of keyboard, video display and mouse can only operate for one of the linked computers. Some currently available new computer switches may further support the sharing of USB interface ports and audio equipments.

Whereas, for many companies or users, the aforementioned computer switch may be a sort of relatively expensive server equipments, so, once the computer switch fails, it would become a significant expenditure for them. Meanwhile, another drawback of the computer switch lies in that, because the computer switch is shared by multiple computer hosts, suppose any one of these computer hosts becomes inoperable, it is almost impossible to directly reboot the failed computer host via the computer host, but needs to restart the computer switch so as to successfully reboot all of the computer hosts. This approach may, however, undesirably cause a total shutdown of all servers for a duration of time. Accordingly, to servers requiring effective long-term operations, huge losses or numerous consumer complaints may inevitably occur.

Consequently, it would be an optimal solution to install connection ports and microprocessors inside an extension cord socket thereby allowing connections to multiple computer hosts, determine whether any one of the computer hosts fails according to the signals returned from such ports, and, in case the failure problem indeed occurs, to restart the AC power regarding to the failed computer host such that the failed computer host can automatically reboot.

SUMMARY OF THE INVENTION

As such, the present invention is addressed to provide a computer host power management system having extension cord sockets, in which connection ports and microprocessors can be installed inside an extension cord socket thereby allowing connections to multiple computer hosts, the microprocessors determine whether any one of the computer hosts fails according to the signals returned from such ports, and, in case the failure problem indeed occurs, the AC power regarding to the failed computer host can be restarted such that the failed computer host can automatically reboot.

The computer host power management system having extension cord sockets according to the present invention can achieve the aforementioned objectives, comprising a socket body, in which the socket body includes at least an AC power output plughole and an AC power input plug, and each of such AC power output plugholes enables a connection to a computer host thereby providing AC power to the computer host; a control device, installed inside the socket body and comprising a first microprocessor and more than one USB port; wherein the first microprocessor is used to manage and run the operations of the control device; the more than one USB port is electrically connected to the first microprocessor in order to electrically connect the computer host to the USB port through a USB transmission line such that the computer host can transfer signals to the first microprocessor and the first microprocessor can return signals to the computer host via the USB transmission line; a power supply device, installed inside the socket body and comprising an AC/DC converter, a second microprocessor, inclusively at least a drive circuit and inclusively at least a power automatic switch; wherein the AC/DC converter receives AC power, converts the received AC power into DC power, and then provides it to circuits of the control device and the power supply device; the second microprocessor is electrically connected to the first microprocessor in the control device and receives signals from the first microprocessor, thus controlling the drive circuit to drive the operations of the power automatic switch in accordance with the received signals; the power automatic switch is connected to the drive circuit as well as the AC power input plug and AC power output plugholes of the socket body thereby controlling whether AC power should be outputted to the computer host through the AC power output plugholes.

According to the present invention, it is through the first microprocessor in the control device to determine whether the signal transferred from the computer host by way of the USB port is normal; in case of abnormal conditions, the second microprocessor in the power supply device is driven to cause the power automatic switch to turn off the AC power such that the computer host enters into the shutdown status; after a lapse of preset time, the second microprocessor drives once again the power automatic switch to turn on AC power thereby rebooting the computer host.

More specifically, the aforementioned second microprocessor includes a counter and a boot time setting value; when the AC power output is stopped, the counter starts to count, and later, upon reaching the time setting value, the AC power output is automatically resumed.

More specifically, the aforementioned control device includes a network interface module, and the network interface module is electrically connected to the first microprocessor and capable of performing Internet connections with a remote monitor device through the network interface module thereby transferring signals to the remote monitor device.

More specifically, the aforementioned control device includes a GSM interface module, and the GSM interface module is connected to the first microprocessor and capable of allowing a remote monitor device to connect to the first microprocessor via a GSM network such that the remote monitor device can receive messages sent by the first microprocessor.

More specifically, the aforementioned remote monitor device is a computer or a mobile phone.

More specifically, the aforementioned USB port can be further connected to a web camera, and the images captured by the web camera can be transferred to the remote monitor device by way of the first microprocessor as well as the network interface module or the GSM interface module.

More specifically, the aforementioned power automatic switch is a relay.

More specifically, the aforementioned control device further includes a network connection port connected to the network interface module such that a network line can be connected to the computer host and plugged into the network connection port thereby completing Internet connections by means of the network interface module; in addition, the first microprocessor can perform linkage tests via the network interface module to test whether the IP address of the computer host and the network connection are normal, in which the first microprocessor can further transfer control signals to the second microprocessor in order to enable the power automatic switch to control the AC power output so the computer host can be turned on and off automatically.

More specifically, the aforementioned power supply device includes a power detection circuit electrically connected to the AC/DC converter and the second microprocessor, in which the power automatic switch converts the outputted AC power into DC power through the AC/DC converter and inputs it to the power detection circuit so as to determine the stability in the AC power outputted to the computer host by means of the power detection circuit, and then the detection results are sent to the second microprocessor thus that the second microprocessor enables the power automatic switch to control automatic shutdown and reboot operations of the computer host.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings.

Figure 1:
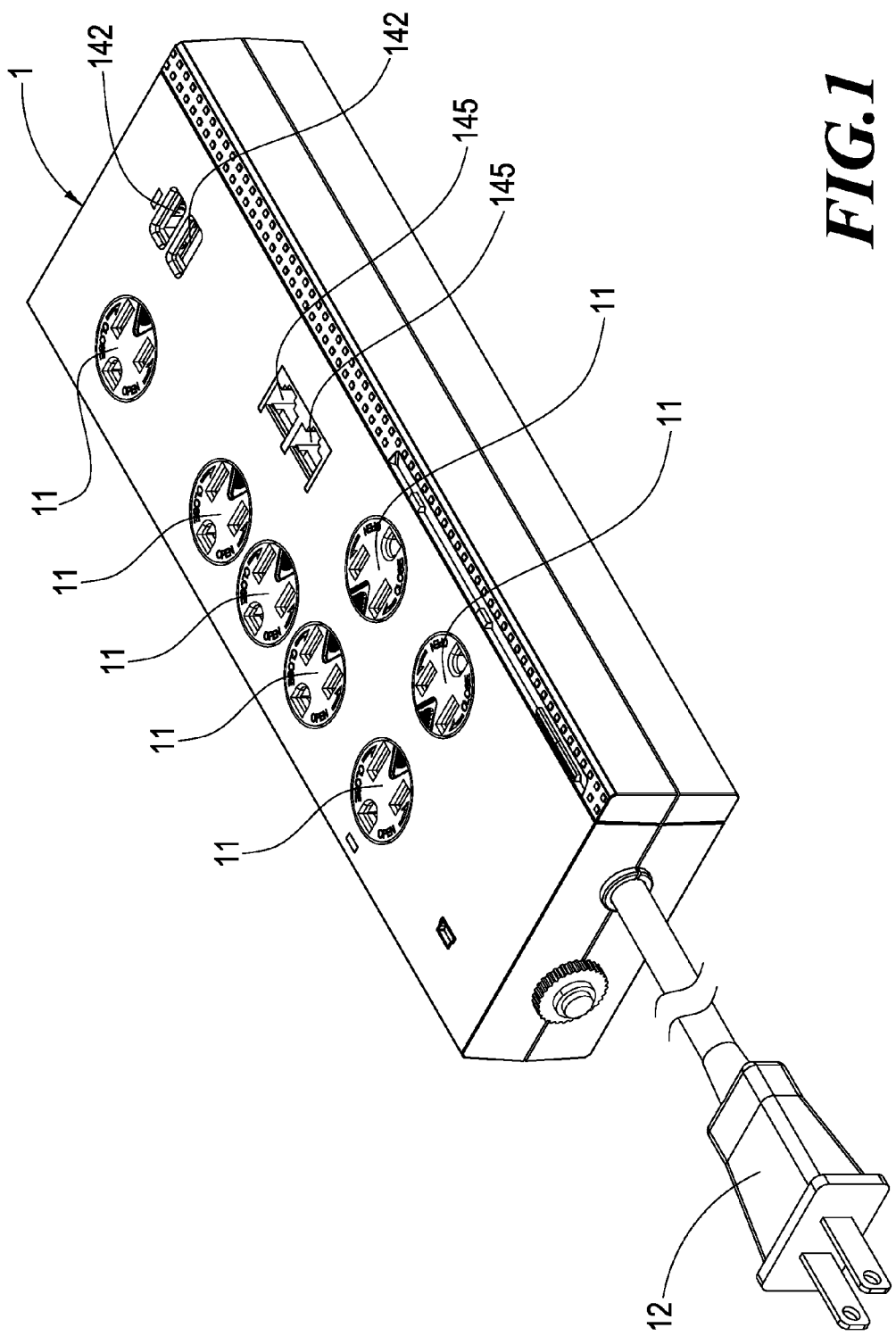
FIG. 1 shows a diagram for the socket body of the computer host power management system having extension cord sockets according to the present invention.
Figure 2:
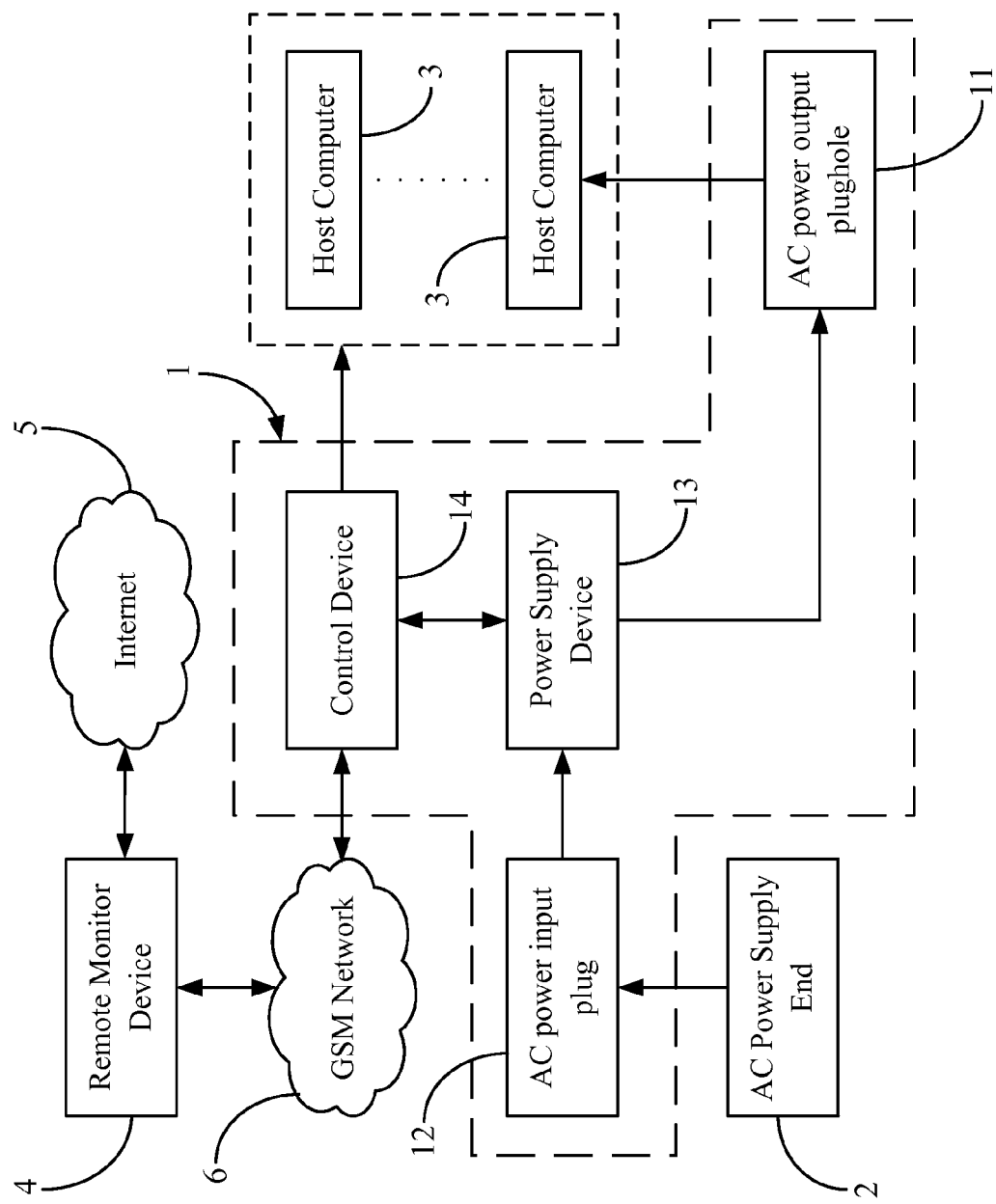
FIG. 2 shows a diagram for the integral architecture of the computer host power management system having extension cord sockets according to the present invention.

Refer first to FIGS. 1 and 2, wherein a diagram for the socket body and a diagram for the integral architecture of the computer host power management system having extension cord sockets according to the present invention are respectively shown. As shown in Figures, a socket body 1 includes AC power output plugholes 11 and an AC power input plug 12, wherein the AC power input plug 12 can be plugged into an AC power supply end 2 in order to input AC power to the socket body 1 through the AC power supply end 2, and the power line of the computer host 3 can be further inserted to the AC power output plugholes 11 thereby acquiring required AC power for the computer host 3.

Figure 3:
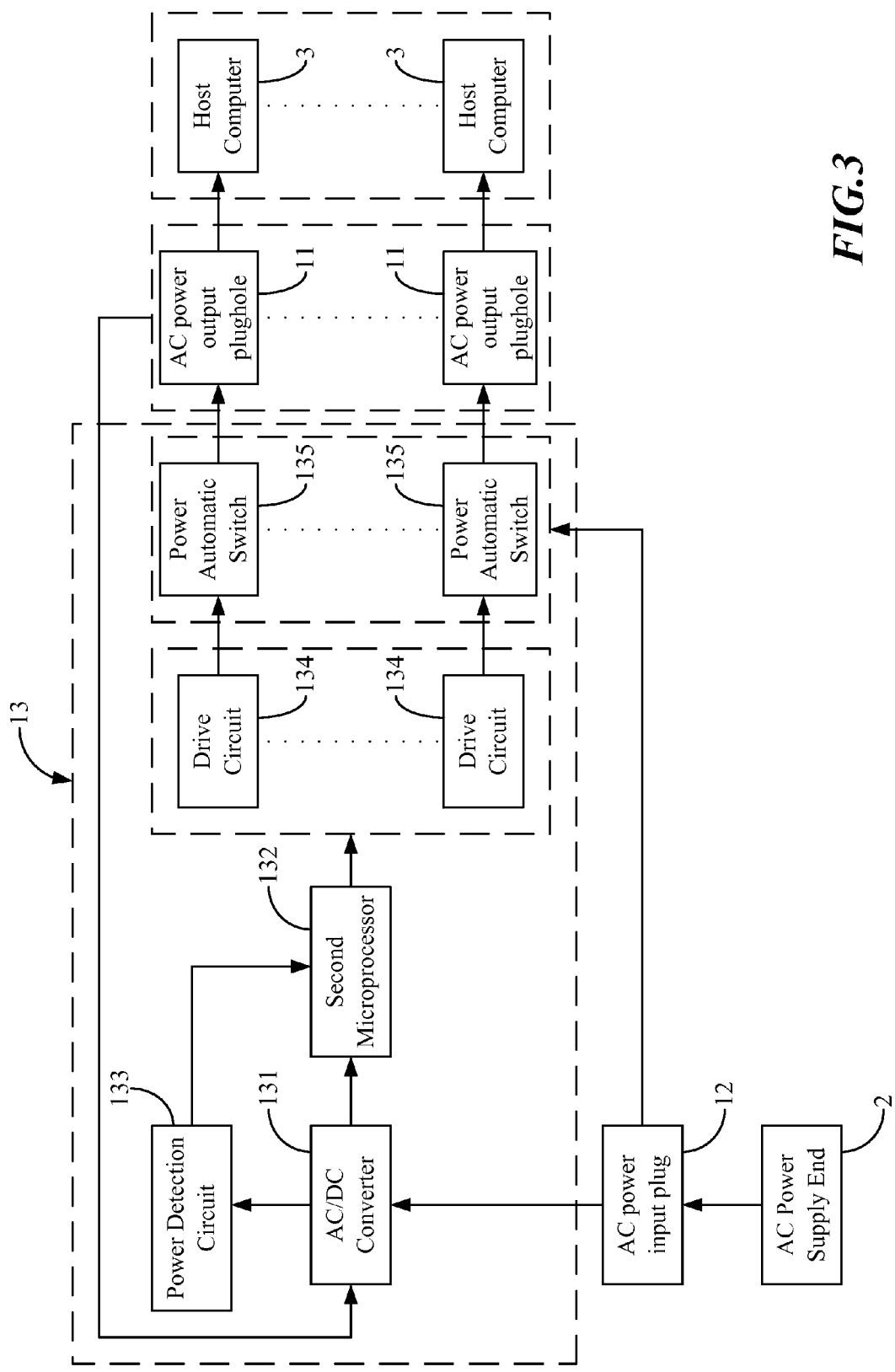
FIG. 3 shows a diagram for the architecture in the power supply device of the computer host power management system having extension cord sockets according to the present invention.

In addition, a power supply device 13 and a control device 14 are further installed inside the socket body 1, as shown in FIG. 3. The power supply device 13 includes an AC/DC converter 131, a second microprocessor 132, a power detection circuit 133, inclusively at least a drive circuit 134 and inclusively at least a power automatic switch 135, wherein the AC/DC converter 131 receives AC power and converts the received AC power into DC power thus providing to the circuits installed in the control device 14 and the power supply device 13. Moreover, the second microprocessor 132 in the power supply device 13 is electrically connected to the first microprocessor 141 in the control device 14, and receives signals from the first microprocessor 141 so as to control the drive circuit 134 to enable the power automatic switch 135 in accordance with the received signals.

Also, it can be seen from FIG. 3 that the power automatic switch 135 is connected to the drive circuit 134 as well as the AC power input plug 12 and AC power output plugholes 11 of the socket body 1, so, in case the second microprocessor 132 determines the power output is required, the drive circuit 134 can be enabled and drives the power automatic switch 135 to control whether AC power should be outputted to the computer host 3 by way of the AC power output plugholes 11. Furthermore, the power detection circuit 133 is electrically connected to the AC/DC converter 131 and the second microprocessor 132, so, upon outputting AC power to the AC power output plugholes 11 by the power automatic switch 135, the power automatic switch 135 can further convert the outputted AC power to DC power with the AC/DC converter 131 and input to the power detection circuit 133. Then, the power detection circuit 133 determines the stability in the AC current outputted to the computer host 3 and sends the detection results to the second microprocessor 132, so the second microprocessor 132 is allowed to enable the power automatic switch 135 thereby controlling whether the computer host 3 is required to be automatically shut down and reboot.

Meanwhile, the second microprocessor 132 includes a counter and a boot time setting value; therefore, when the AC power output is stopped, the counter starts to count, and later, upon reaching the time setting value, the AC power output is automatically resumed.

Figure 4:
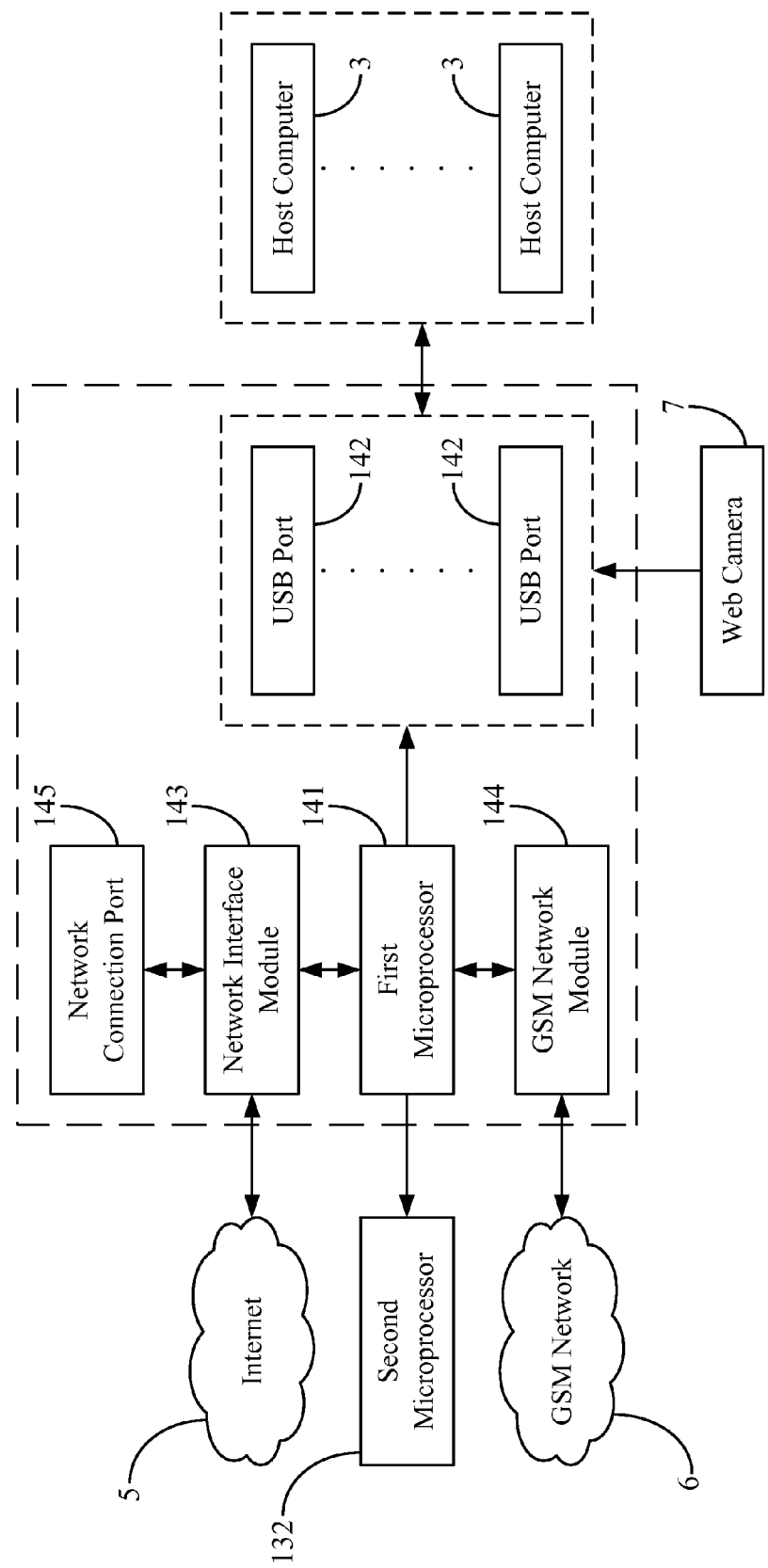
FIG. 4 shows a diagram for the architecture in the control device of the computer host power management system having extension cord sockets according to the present invention.

Additionally, as shown in FIG. 4, the control device 14 includes a first microprocessor 141, more than one USB port 142, a network interface module 143, a GSM network module 144 and one or more network connection ports 145 connected to the network interface module 143. Herein the computer host 3 can be electrically connected to the USB port 142 through a USB transmission line such that the computer host 3 can transfer signals to the first microprocessor 141 and the first microprocessor 141 can return signal to the computer host 3 by way of the USB transmission line. Therefore, in case the signals transferred by the computer host 3 through the USB port 142 become abnormal or interrupted, the first microprocessor 141 determines the computer host 3 is crashed or inoperable, so the first microprocessor 141 transfers signals to the second microprocessor 132 such that the second microprocessor 132 drives the power automatic switch 135 to turn off AC power thus causing the computer host 3 to enter into the shutdown status. Following this, after a lapse of preset time, the second microprocessor 132 drives once again the power automatic switch 135 to turn on AC power for restarting the computer host 3.

Besides, the network interface module 143 is electrically connected to the first microprocessor 141, and the first microprocessor 141 can perform Internet connections by means of the network interface module 143 or the GSM network module 144 so as to transfer signals to a remote monitor device 4.

Herein, if the remote monitor device 4 is a computer, then it is required to link to the Internet 5 to transfer data via the network interface module 143; or alternatively, suppose the remote monitor device 4 is a mobile phone, then it can be through the GSM network module 144 to link to a GSM network 6 for data transmissions.

Also, the network interface module 143 is further connected to the network connection port 145. A network line can be connected to the computer host 3 and inserted to the network connection port 145 thereby connecting to the Internet 5 through the network interface module 143. In addition, the present invention can perform connection tests by means of the network interface module 143 to see whether the IP address and network connection of the computer host 3 are normal, in which such tests are completed mainly by verifying whether the computer host 3 can be reached through the IP. Suppose the computer host 3 can not respond and return a package, then the first microprocessor 141 determines the computer host 3 is crashed or inoperable, so the first microprocessor 141 further transfers control signals to the second microprocessor 132 to enable the power automatic switch 135 thereby restarting AC power output such that the computer 3 can be turned on or off automatically.

Moreover, the USB port 142 can be further connected to a web camera 7, in which the web camera 7 can focus on the running computer host 3 to capture the images of operations on the computer host 3, and the captured images can be transferred to the remote monitor device 4 by way of the first microprocessor 141 as well as the network interface module 143 or the GSM interface module 144.

Figure 5:
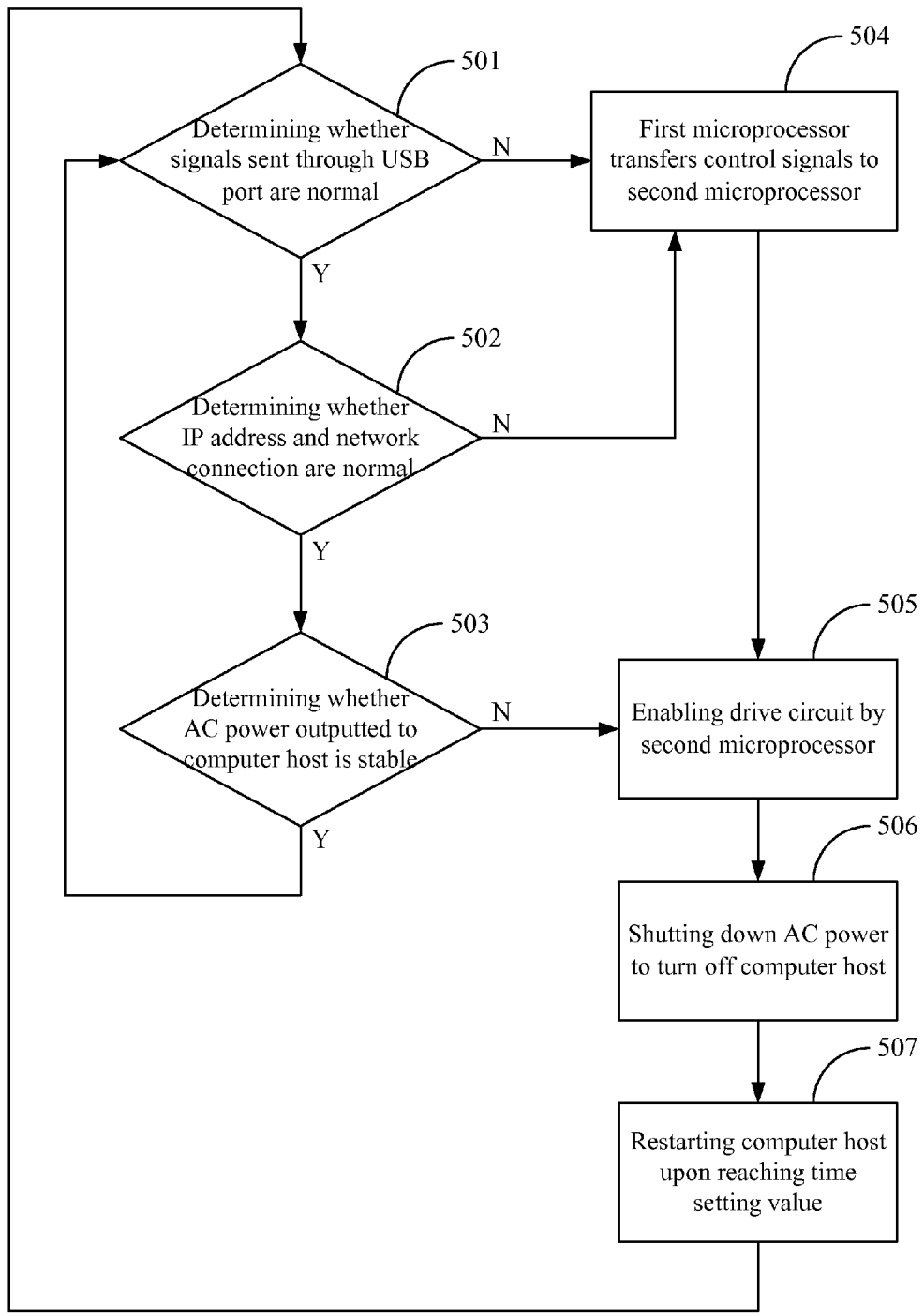
FIG. 5 shows a diagram for the implementation steps of the computer host power management system having extension cord sockets according to the present invention.

Furthermore, in addition to automatic determination on abnormal conditions to automatically reboot, it is possible as well to send abnormal messages to the remote monitor device 4 and allow the remote monitor device 4 to further determine the seriousness of such abnormalities; if the remote monitor device 4 determines the reboot action is indeed required, the remote monitor device 4 will control the first microprocessor 141 to transfer control signals to the second microprocessor 132 in order to control the power automatic switch 135 thereby restarting AC power output such that the computer host 3 can be automatically turned on or off. In the present application, it is essentially based on the status in the computer host to determine whether reboot actions are needed, as shown in FIG. 5, whose implementation steps include, as below:

1. determining by the first microprocessor whether signals transferred from the computer host through a USB port are normal (501); if determined to be abnormal signals or interrupted signal transmissions, then going to STEP 504; otherwise, continuing the next determination;

2. determining by the first microprocessor whether the IP address and network connection are normal (502); if determined to be abnormal, then going to STEP 504; otherwise, continuing the next determination;

3. determining by the second microprocessor whether AC power outputted to the computer host is stable (503); if determined to be unstable AC power, then going to STEP 505; otherwise, returning to STEP 501 and restarting the determination;

4. transferring control signals by the first microprocessor to the second microprocessor (504) and enabling the drive circuit (505) by the second microprocessor, then the drive circuit further drives the power automatic switch so as to shut down AC power to turn off the computer host (506);

5. later, after a lapse of preset time, driving the power automatic switch by the second microprocessor to turn on AC power thereby rebooting the computer host (507), and then, upon completing reboot actions, returning to STEP 501 to restart the determination.

Besides, in addition to the aforementioned implementation steps, different determination sequences can be also applied; in other word, it is possible to first determine the normality in the IP address and network connection, or alternatively first determine whether AC power outputted to the computer host 3 is stable. Meanwhile, in the aforementioned implementation steps, suppose any one of the determination results turns out to be abnormal, reboot actions will be executed; however, it is also possible to be configured as proceeding reboot actions only if two determinations or three determinations are simultaneously verified (e.g., reboot actions of the computer host 3 will not be performed unless both signals transferred from the computer host 3 through a USB port 142 are abnormal and AC power outputted to the computer host 3 is unstable).

Compared with other prior art technologies, the computer host power management system having extension cord sockets according to the present invention further enables the following advantages:

1. The present invention can install connection ports and microprocessors inside an extension cord socket thereby allowing connections to multiple computer hosts, determine whether any one of the computer hosts fails according to the signals returned from such ports, and, in case the failure problem indeed occurs, to restart the AC power regarding to the failed computer host such that the failed computer host can automatically reboot.

2. In comparison with conventional computer switches (i.e., KVMs), the present invention allows reduced integral costs, and in case any one of the connected computer hosts fails, it is merely required to restart the failed computer host, rather than having to reboot all of the computer hosts as with the conventional computer switch KVM, thus demonstrating greater application values of the present invention than the conventional computer switch KVM.

By way of the aforementioned detailed descriptions for the preferred embodiments according to the present invention, it is intended to better illustrate the characters and spirit of the present invention rather than restricting the scope of the present invention to the preferred embodiments disclosed in the previous texts. Contrarily, the objective is to encompass all changes and effectively equivalent arrangements within the scope of the present invention as delineated in the following claims of the present application.

What is claimed is:

1. A computer host power management system having extension cord sockets, comprising:

a socket body, in which the socket body includes at least an AC power output plughole and an AC power input plug, and each of such AC power output plugholes enables a connection to a computer host thereby providing AC power to the computer host;

a control device, installed inside the socket body and comprising a first microprocessor and more than one USB port; wherein the first microprocessor is used to manage and run the operations of the control device; the more than one USB port is electrically connected to the first microprocessor in order to electrically connect the computer host to the USB port through a USB transmission line such that the computer host can transfer signals to the first microprocessor and the first microprocessor can return signals to the computer host via the USB transmission line;

a power supply device, installed inside the socket body and comprising an alternative current (AC)/direct current (DC) converter, a second microprocessor, inclusively at least a drive circuit and inclusively at least a power automatic switch; wherein the AC/DC converter receives AC power, converts the received AC power into DC power, and then provides it to circuits of the control device and the power supply device; the second microprocessor is electrically connected to the first microprocessor in the control device and receives signals from the first microprocessor, thus controlling the drive circuit to drive the operations of the power automatic switch in accordance with the received signals; the power automatic switch is connected to the drive circuit as well as the AC power input plug and AC power output plugholes of the socket body thereby controlling whether AC power should be outputted to the computer host through the AC power output plugholes;

in which it is through the first microprocessor in the control device to determine whether the signal transferred from the computer host by way of the USB port is normal; in case of abnormal conditions, the first microprocessor determines the computer host as crashed or inoperable and drives the second microprocessor in the power supply device to cause the power automatic switch to turn off the AC power outputted by all of the AC power output plugholes, such that the computer host enters into the shutdown status; after a lapse of preset time, the second microprocessor drives once again the power automatic switch to turn on AC power thereby rebooting the computer host by the computer host power management system itself;

wherein the second microprocessor includes a counter and a boot time setting value; when the AC power of all of the AC power output plugholes is stopped, the counter starts to count, and later, upon reaching the time setting value, the second microprocessor automatically causes the power automatic switch to turn on and thus resume the AC power of all of the AC power output plugholes.

2. The computer host power management system having extension cord sockets according to claim 1, wherein the control device includes a network interface module, and the network interface module is electrically connected to the first microprocessor and capable of performing Internet connections with a remote monitor device through the network interface module thereby transferring signals to the remote monitor device.

3. The computer host power management system having extension cord sockets according to claim 2, wherein the USB port can be further connected to a web camera, and the images captured by the web camera can be transferred to the remote monitor device by way of the first microprocessor as well as the network interface module.

4. The computer host power management system having extension cord sockets according to claim 1, wherein the control device includes a GSM interface module, and the GSM interface module is connected to the first microprocessor and capable of allowing a remote monitor device to connect to the first microprocessor via a GSM network such that the remote monitor device can receive messages sent by the first microprocessor.

5. The computer host power management system having extension cord sockets according to claim 4, wherein the remote monitor device is a computer or a mobile phone.

6. The computer host power management system having extension cord sockets according to claim 4, wherein the USB port can be further connected to a web camera, and the images captured by the web camera can be transferred to the remote monitor device by way of the first microprocessor as well as the GSM interface module.

7. The computer host power management system having extension cord sockets according to claim 1, wherein the USB port can be further connected to a web camera, and the images captured by the web camera can be transferred to the remote monitor device by way of the first microprocessor.

8. The computer host power management system having extension cord sockets according to claim 1, wherein the power automatic switch is a relay.

9. The computer host power management system having extension cord sockets according to claim 1, wherein the control device further includes a network connection port connected to the network interface module such that a network line can be connected to the computer host and plugged into the network connection port thereby completing Internet connections by means of the network interface module; in addition, the first microprocessor can perform linkage tests via the network interface module to test whether the IP address of the computer host and the network connection are normal, in which the first microprocessor can further transfer control signals to the second microprocessor in order to enable the power automatic switch to control the AC power output so the computer host can be turned on and off automatically.

10. The computer host power management system having extension cord sockets according to claim 1, wherein the power supply device includes a power detection circuit electrically connected to the AC/DC converter and the second microprocessor, in which the AC/DC converter converts the AC power outputted by the AC power output plugholes into DC power and inputs the AC power to the power detection circuit so as to determine the stability in the AC power outputted to the computer host by means of the power detection circuit, and then the detection results are sent to the second microprocessor thus that the second microprocessor enables the power automatic switch to control automatic shutdown and reboot operations of the computer host.

* * * * *